(12) United States Patent
Gagnon

(10) Patent No.: US 6,267,014 B1
(45) Date of Patent: Jul. 31, 2001

(54) APPARATUS FOR SENSING A LOAD OF PRESSURE APPLIED TO A SURFACE

(75) Inventor: Robert E. Gagnon, Mount Pearl (CA)

(73) Assignee: National Research Council of Canada, Ottawa (CA)

( * ) Notice: Subject to any disclaimer, the term of this patent is extended or adjusted under 35 U.S.C. 154(b) by 0 days.

(21) Appl. No.: 09/482,318

(22) Filed: Jan. 14, 2000

(51) Int. Cl.[7] ..................................................... G01D 7/00
(52) U.S. Cl. ................................................... 73/862.046
(58) Field of Search ...................... 73/762, 800, 862.041, 73/862.043, 862.046

(56) References Cited

U.S. PATENT DOCUMENTS

| | | | | |
|---|---|---|---|---|
| 3,987,668 | * | 10/1976 | Propenoe | .................................. 73/88 |
| 4,599,908 | * | 7/1986 | Sheridan et al. | ................... 73/862.04 |
| 4,644,801 | * | 2/1987 | Kustanovich | ..................... 73/862.04 |
| 4,901,584 | * | 2/1990 | Bruner et al. | ...................... 73/862.04 |
| 6,160,264 | * | 12/2000 | Rebiere | ............................ 250/559.22 |

* cited by examiner

Primary Examiner—Max Noori

(57) ABSTRACT

Apparatus for sensing and/or measuring load distribution applied to a surface, having a platen providing a continuous, stiff, unapertured surface, a flexible load receiving sheet extending over the platen surface, and a layer of deformable material separating and capable of contacting both the platen surface and the load receiving sheet and which is compressed in thickness when loads are applied to the sheet. The deformable layer is provided with regularly spaced voids, for example holes or gaps, such that the deformable material bulges into these voids when compressed across its thickness. Either the platen or the load receiving sheet is transparent, and the deformable layer is viewed through a surface of the transparent member to detect reductions in the areas of the voids caused by loading of the load receiving sheet. The viewing may be done by a video camera.

9 Claims, 7 Drawing Sheets

APPARATUS FOR SENSING A LOAD OF PRESSURE APPLIED TO A SURFACE

BACKGROUND OF THE INVENTION

1. Field of the Invention

The present invention relates to an opto-mechanical sensor for providing load and/or pressure distribution data, and especially to a pressure sensor providing high spatial resolution over a large area on a surface exposed to constant or varying forces. The system can provide large quantities of information in a visual and digital format using simple and easily implemented techniques. The sensor may have a large area, of several square meters, or a small area of less than one square centimeter. The pressures to be measured may also vary greatly.

2. Prior Art

Loads and pressure distributions on surfaces have traditionally been measured using mechanical load cells for the force on the whole surface and pressure sensors incorporated into the surface for local force and pressure measurement. The load cells are made of a material, usually metal, that deforms under load and the strain is monitored using an attached strain gauge. The pressure sensors are generally mechanical in design.

One type of pressure sensor is the piston/diaphragm design where load on the pressure head is transmitted through the piston to the diaphragm causing a deflection and a consequent change in output from a strain sensor on the diaphragm. Piezoelectric films are also available for measuring dynamic load and pressure. These existing technologies have drawbacks.

Firstly, the piston/diaphragm sensors require fairly extensive modification of the surface for installation and are limited in the number that can be installed so that large areas cannot be instrumented nor can the spatial resolution be very great because of structural modifications to the surface. Every sensor must have appropriate electrical connections which further limit the number and extent of the sensors on a surface.

Piezoelectric film has the advantage over piston sensors that the surface does not require much alteration and the spatial resolution can be high for the sensor spacing. The sensors can only be used for dynamic load situations however and there is still the issue of wiring being required for each of the sensing elements in a sensor array. They are impractical for coverage of large areas at high spatial resolution because of the demands on the data acquisition system. For example a one metre by one metre array of sensors with one centimetre spatial separation implies that there are 10,000 individual sensors from which to acquire data.

Surface-area transducers using electrical components such as capacitors to measure pressure distribution are also known, for example as described in U.S. Pat. No. 4,644,801 to Kustanovich, issued Feb. 24, 1987. Such transducers also require rather complex data acquisition systems.

U.S. Pat. No. 4,599,908 to Sheridan et al., issued Jul. 15, 1986, describes a system in which a pressure deformable body has an array of holes which are each aligned with a hole in a supporting base or platen, and each of the base or platen holes is fitted with the end of an optical fiber. The upper surface of the deformable body is covered by a load receiving flexible sheet, and when the flexible sheet is subjected to loads it causes the deformable body to bulge into its holes to reduce the hole diameter. The optical fibers are connected to a receiver viewed by a video camera, and the optical fibers transmit signals to the camera which indicate the reduction in hole diameter caused by the pressure. The Sheridan et al. system has drawbacks similar to those systems having a large number of load sensors, in that the fibers have to be attached individually to the holes, and a one metre by one metre array at one centimetre spacing would require 10,000 fibers. With less fibers, the resolution will be low. The need for a fiber connection corresponding to each hole also limits the nature of the deformable body; it needs an array of holes matching those of the base, which involves substantial expense, and cannot be formed as a body having a series of slits, as may be desirable for economy.

Other pressure distribution sensors use optical fibers in the plane of the sensors and which are sensitive to bending of the fibers or to contacts made between fibers when pressed together under pressure; an example is U.S. Pat. No. 4,901,584, issued to Brunner et al. on Feb. 20, 1990.

A pressure sensor is also known from U.S. Pat. No. 3,987,668, issued to Popenoe on Oct. 26, 1976. This uses a flexible light transmitting member which, under pressure, is pushed into contact with a light absorbing member; the area of contact between the light transmitting member and the light absorbing member is recognized by the frustration of internal reflection which occurs in this area. However, this sensor is only suitable for indicating overall pressure, and it is not suitable for showing pressure distribution since any area subjected to pressure affects neighbouring areas.

SUMMARY OF THE INVENTION

The present invention provides a load sensor arrangement for indicating pressure distribution which is similar to that of the Sheridan et al. patent in using a deformable body, specifically a deformable layer of material, but avoids limitations of Sheridan et al. It differs from the latter, and some other prior art sensors, in that it does not need optical fibers, and is capable of giving load sensing information at high resolution, over a large area, at comparatively low cost as compared to the Sheridan et al. arrangement. In various forms of the invention it is capable of being monitored remotely either from the same side as the base or platen, i.e. opposite to that receiving the load or pressure, or from the same side as the pressure applying medium if this is transparent, for example if it is water or air, or from the edges of a thick platen having flat and clear edge surfaces. Since no optical fibers or similar cable means are required the base or platen may be isolated from the monitoring means. This may be useful for example where it is required to allow movement between the platen and the monitoring means or where the closeness of monitoring means to the platen would disrupt fluid flow.

In accordance with one aspect of the invention, apparatus for sensing loads applied to a surface comprises a platen providing a continuous, unapertured surface which is stiff relative to the loads being detected, a load receiving sheet extending over the platen surface and having an outer load receiving surface, and a layer of deformable material separating the platen surface and the sheet, and which is capable of contacting the platen surface and sheet, and which is compressed in thickness when loads are applied to the sheet. The deformable layer is provided with regularly spaced voids, such as apertures or gaps or recesses, so that the deformable material bulges into these voids when compressed across its thickness. Either the platen or the sheet is a transparent member and the deformable layer is such that its area of contact with the transparent member increases as the material is compressed in thickness. The apparatus includes a means such as a video camera viewing the deformable layer directly through the transparent member, i.e. without the intermediary of optical fibers, and capable of detecting the increased area of contact between the deformable layer and the transparent member caused by loading of the sheet. "Viewing the deformable layer, etc.", includes viewing a surface of the transparent member so as to determine its area of contact with the deformable layer; the surface viewed includes many voids.

Normally, the load receiving sheet is flexible and bends in response to loads to compress areas of the deformable layer corresponding to areas of the sheet subjected to loads. However, a simple kind of load cell could be made with a rigid load receiving sheet, in which case the measurements obtained from reduction in the void sizes would be indicative of the average load on the sheet.

The platen may be a sheet of transparent plastic material which constitutes the transparent member. Alternatively, instead of the platen being transparent, the load receiving sheet may be the transparent member, and the apparatus may include a video camera viewing the deformable layer through the transparent load receiving sheet and detecting reductions in the areas of the voids caused by loading of the sheet.

As indicated, the voids in the deformable material are such that when the material is under load the area of contact between the material and the platen increases, and this area of contact may be indicated by frustration of total or partial internal reflection which occurs where the deformable material contacts the platen. The platen may be a slab of transparent material having opposed edge surfaces which are flat and clear, the apparatus including a light source directing light into one of the edge surfaces at an angle providing total internal reflection at surfaces of the platen adjacent the voids in the deformable layer. A video camera may view the light reflected by the deformable layer through a surface of the platen, or it may monitor the internally reflected light through an edge surface of the platen opposite to the light source. The latter system may be used where the only convenient access to the platen is through its edges. It may be noted that with the kind of deformable sheet used by Sheridan et al., there is little increase in the area of contact between the deformable sheet and the platen when the deformable sheet is compressed, so that this method could not be used by Sheridan et al.

BRIEF DESCRIPTION OF THE DRAWINGS

Preferred embodiments of the invention will now be described by way of example with reference to the accompanying drawings, in which.

DETAILED DESCRIPTION

FIGS. 1 to 5, and 7 to 9, show several embodiments of the invention, in which the sensing medium for the apparatus is a deformable sheet or layer having voids such as holes or gaps which are partially closed when the deformable material is compressed across its thickness and bulges into the voids.

Figure 1:
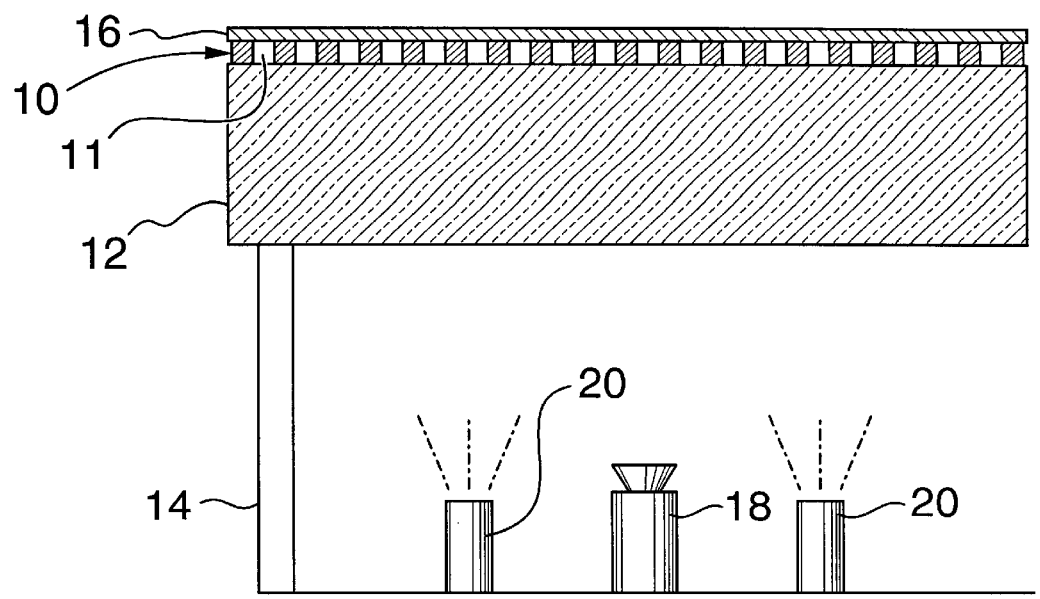
FIG. 1 shows a sectional view of a first embodiment of apparatus in accordance with the invention, using a deformable layer having an array of holes.
Figure 2:
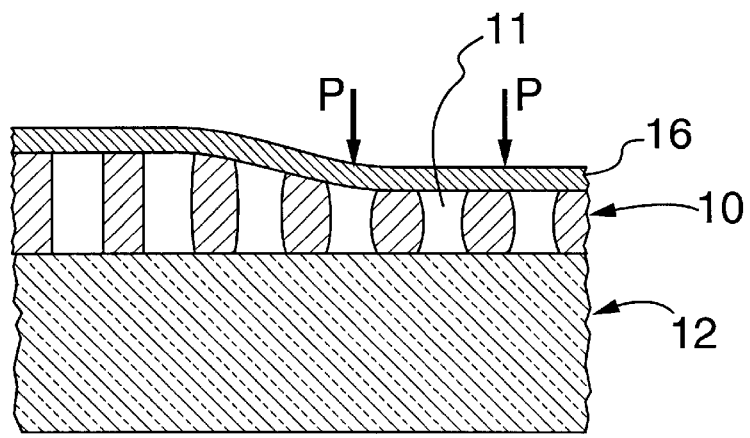
FIG. 2 is a detail of the deformable layer and adjacent parts.

In FIGS. 1 and 2, the deformable layer 10 is supported on a platen 12 formed as a slab of transparent flexible material such as "Plexiglas" (trademark). The slab needs to be rigid relative to the loads being measured. It is supported at its corners clear of a floor by legs 14. A load receiving flexible sheet 16 extends over the platen and rests on top of the deformable layer, so that the deformable layer is between, and in contact with, both the platen and the sheet. The sheet 16, which may be of metal or plastic, is thin enough to bend easily under the kinds of local pressures being sensed.

Figure 3:
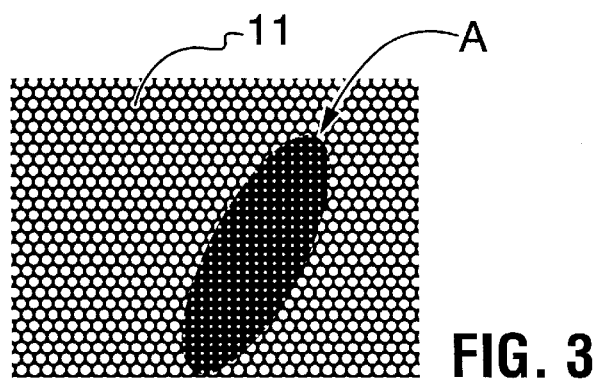
FIG. 3 is a view corresponding to a part of that received by a video camera as used in the embodiment of FIGS. 1 and 2, when a load is applied to one area.

The deformable layer 10 is a perforated sheet having a regular array of closely spaced circular holes 11 which, in the uncompressed state of the sheet, are similar to the holes shown in the main part of the sheet in FIG. 3. As shown in FIG. 2, when parts of the load receiving flexible sheet 12 are pressed down by a load or pressure P, the material surrounding the holes in this area of the deformable layer bulges into the holes and reduces their diameter at the vertical central plane of the layer. The reduction in diameter is indicative of the load, and can be monitored by a video camera 18 mounted on the floor under the platen 12 along with upwardly directed light sources 20.

FIG. 3 shows part of the view recorded by the camera 18 when an elliptically-shaped load has been applied to an area A. The camera is coupled to a computer which records the load measurements. Essentially, the optical sensing device, e.g. the CCD (charge-coupled device) chip of the video camera, serves as a high spatial resolution data acquisition system. Depending on the particular application, a regular video camera or a high speed video camera can be used. For example, a high speed camera with frame rates in the kHz range would be needed for dynamic events, such as ice impacts or indentation against structures, whereas slower events such as water wave and current loading on structures could be monitored using ordinary video equipment that acquires image fields at 60 Hz. Also, a still camera can be used to monitor static loads.

The thickness, hole size, and softness/hardness of the deformable layer will vary greatly depending on the loads to be measured, as indicated in various experiments which have been conducted. For example, a moderately soft rubber sheet, 2–3 mm thick, with 4 mm diameter circular perforations spaced at edges by about 4 mm was used with a 1 mm thick brass load receiving sheet to measure pressure in the 1–10 MPa range, using a set-up similar to that of FIG. 1.

Figure 4:
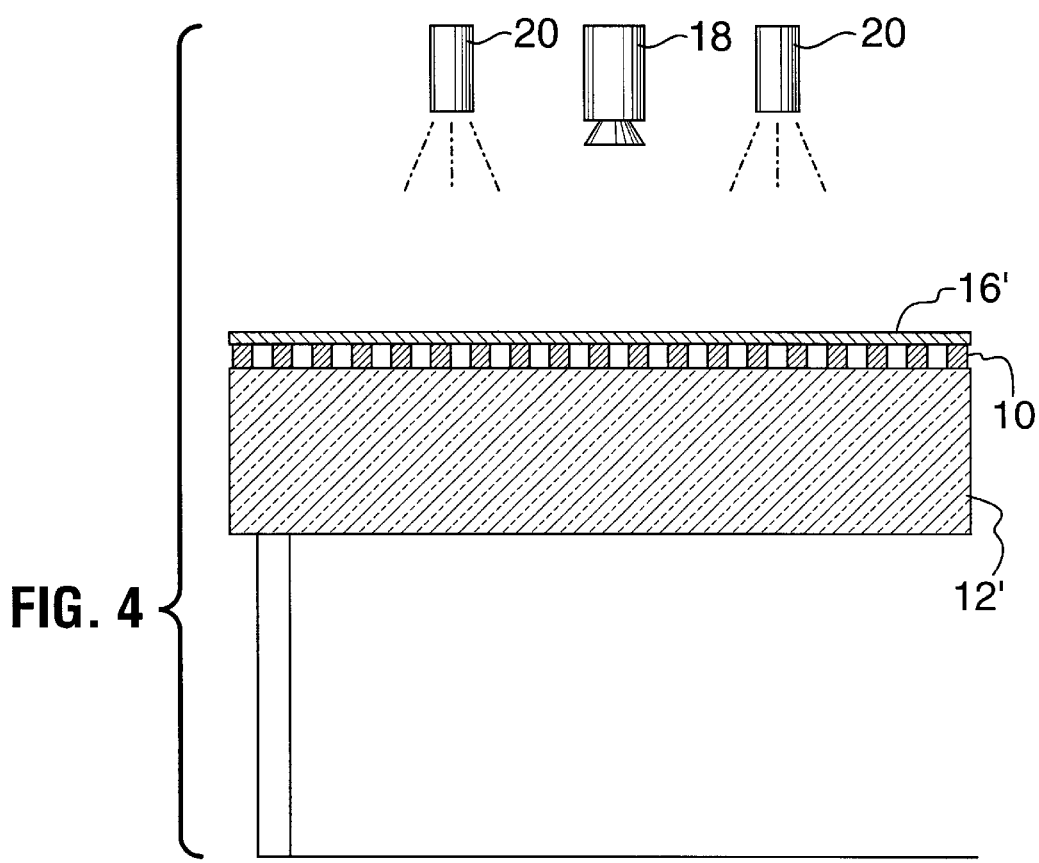
FIG. 4, which appears on the same drawing sheet as FIG. 1, is a view similar to FIG. 1 of a variation of the first embodiment.

FIG. 4 shows a variation of this embodiment in which the platen 12' is opaque, but in which the load-receiving sheet 16' is transparent. Here, the video camera 18 and light sources 20 are mounted above the sheet 16' and the camera views the deformable layer 10 through the sheet 16'. This kind of arrangement can be used where it is desired to measure pressures of air for example on a surface which needs to be opaque, for example the pressures on an aircraft wing being tested in a wind tunnel. Although an aircraft wing does not have a stiffness comparable to a slab of "Plexiglas", it has sufficient stiffness to be used in this situation as the platen, since the pressures involved are below any which would cause substantial distortion of the wing.

Figure 5A:
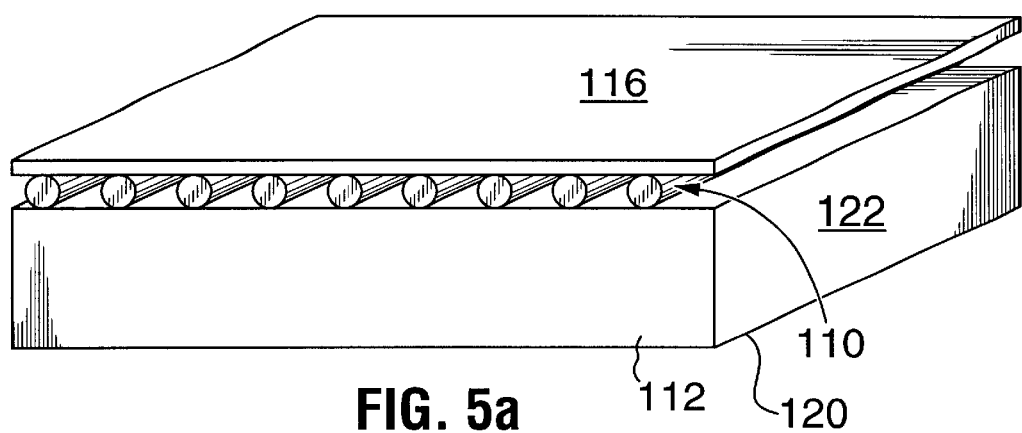
FIG. 5a is a perspective view of a second embodiment of the invention.
Figure 5B:
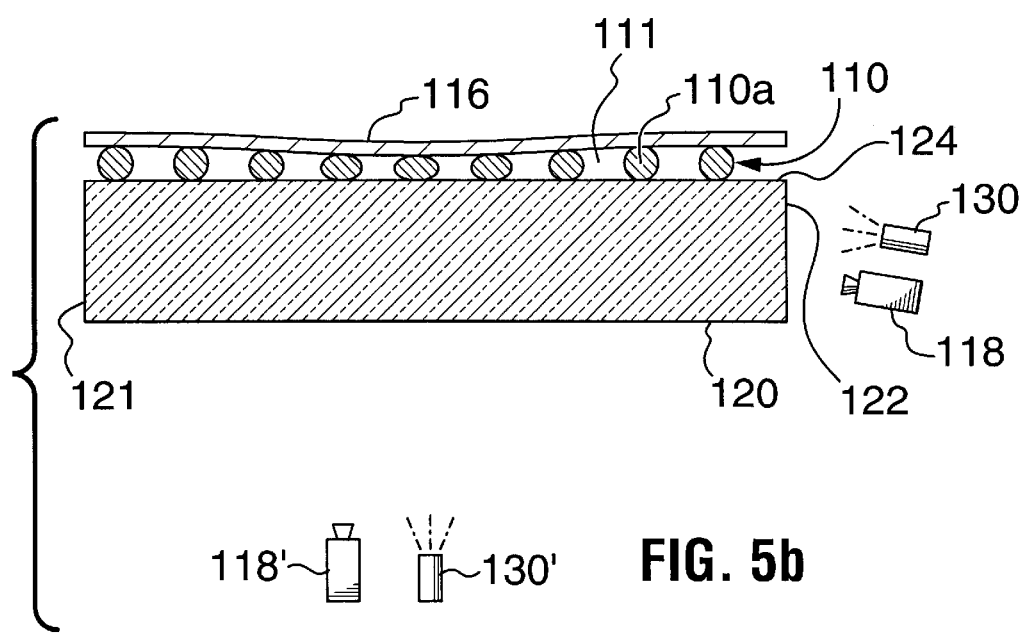
FIG. 5b is a sectional view of the FIG. 5a embodiment, in the loaded condition.

FIGS. 5a and 5b show a variation of this embodiment in which the deformable layer has voids in the form of gaps or slits rather than holes, and wherein the contact area between the deformable layer and the platen increases as the deformable layer bulges into these voids. This contact area is monitored through the side edges of a transparent platen, rather than through the bottom surface of the platen, using light which enters an edge of the platen and which experiences total internal reflection off the top surface of the platen except in areas contacted by the deformable material.

As shown in FIGS. 5a and 5b, the platen 112 is a slab of transparent "Plexiglas" which is trapezoidal in shape, having a horizontal bottom surface 120, two side edges 121 and 122 which are flat and perpendicular to the bottom surface, and a top surface 124. The deformable layer 110 which overlies the platen is constituted by a series of parallel cylindrical strips or strands 110a, separated by parallel gaps 111 which are of constant width when the deformable layer is unstressed. The strands may be pretensioned by stretching them a little, or significantly, in the strand direction, to hold them straight and at uniform spacing, and to adjust the strand diameter. The strands are such as to be flattened by pressure and to bulge into the gaps between them, as shown in FIG. 5b, so increasing the area of contact between the strands and the top of the platen. A flexible load receiving sheet 116 overlies the deformable layer 110.

In this type of arrangement, the increased area of contact between the deformable layer and the platen can be recognised by the fact that this contact frustrates total internal reflection off the inner top side of the platen which would otherwise occur. A light source 130 shines light into one of the edges 122 of the platen, the light from this source being totally reflected off the inside of top surface 124, towards the far side of the platen, except where this reflection is frustrated by the contact between this upper surface 124 and the strands 110a and where the strands can be seen by the camera. For this purpose, the strands are preferably white or of light color. Thus, the monitoring provided by the camera 118, on the same side as the light source 130, provides an indication of the compression of the strands and therefore of the pressure on the various areas of the load receiving sheet 116.

FIG. 5b shows that the camera 118' or the light source 130' may alternatively be located under the bottom surface 120 of the platen.

Figure 6:
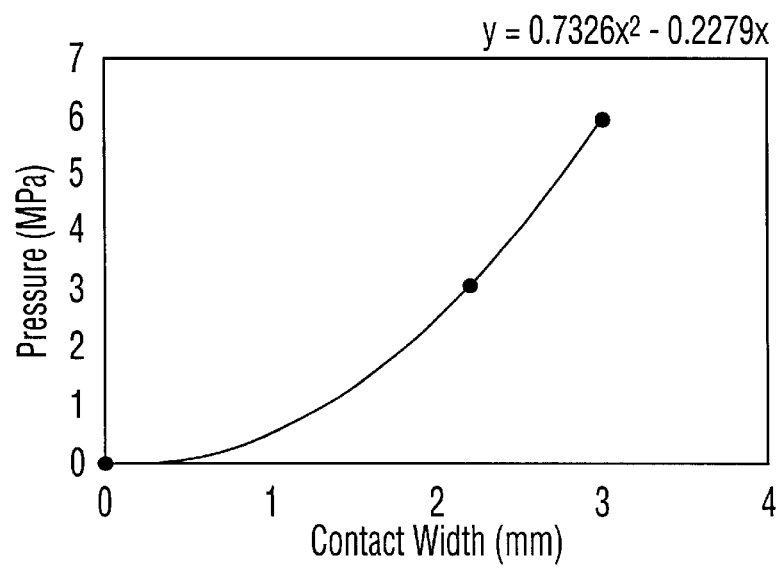
FIG. 6 is a graph showing the relationship of pressure to the contact width of the deformable member, in the FIG. 5b arrangement.

With the set-up of FIGS. 5a and 5b, strands of moderately hard rubber O-ring material 1.7 mm in diameter with approximately 5 mm spacing can be used to measure pressure in the 0–7 MPa range. The results are shown in graphical form in FIG. 6, where the width of the contact occurring when a strand is compressed against the transparent slab is shown plotted against pressure.

Figure 5C:
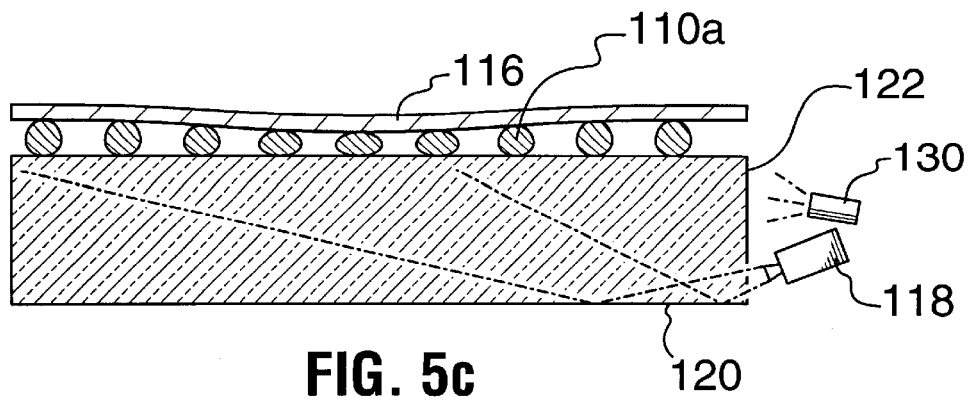
FIG. 5c is a view similar to FIG. 5b of a further embodiment, similar to that of FIG. 5b, but in which the camera position is altered.

FIG. 5c shows an alternative position of camera 118 and light source 130, wherein the camera 118 is directed downwardly to receive light reflected off the lower internal surface 120 of the platen; with this arrangement the angle of view of the of the strips is less steep than with the direct viewing as in FIG. 5b.

Figure 5D:
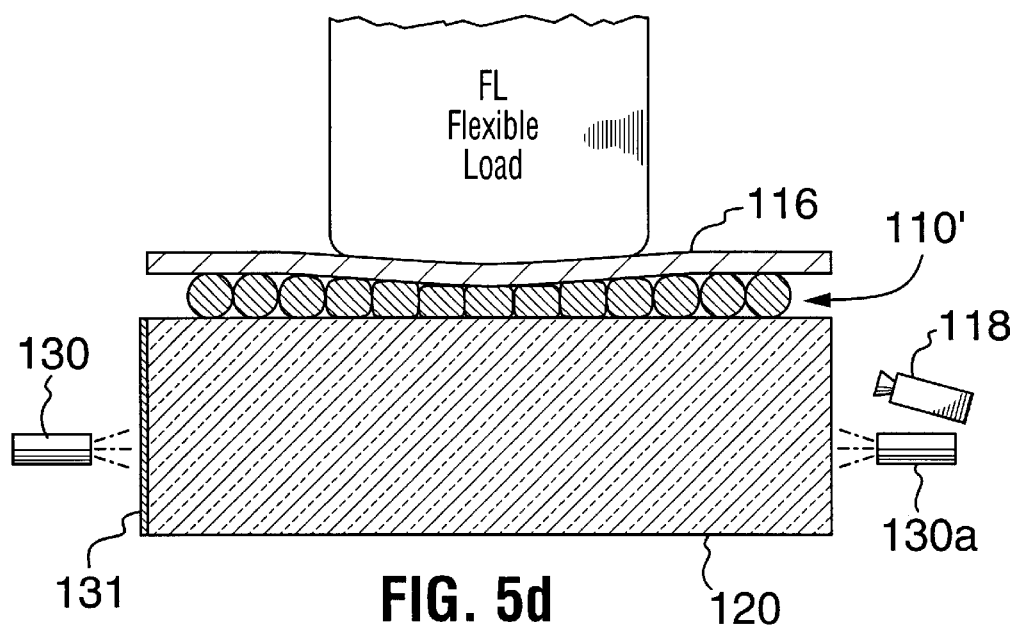
FIG. 5d is a view similar to FIG. 5b of a further variation in which a different form of deformable sheet is used.

FIG. 5d also shows an arrangement also using a deformable layer 110' comprising parallel cylindrical strands, but here the adjacent sides of the strands are in contact with each other even when the layer is undeformed. Although there are no gaps between the strands, the cylindrical form of the strands means that they have voids between them, allowing the strands to deform into these voids when compressed. The strands assume a squared cross-section rather than a flattened shape when they are compressed because they press against each other under the influence of a flexible load FL, as shown at the center of FIG. 5d. This configuration is advantageous because full contact can be achieved between the rubber and the transparent base, with only tiny gaps between strands, at a certain stress, without causing extreme distortions of the strands, whereas the configuration in FIG. 5a would require extreme flattening to achieve full contact coverage. Strands of 0.6 mm diameter configured as in FIG. 5d were suitable for pressure measurement in the 0–3 MPa range.

While the FIG. 5d arrangement can use the same light/camera configuration as FIG. 5b, FIG. 5d shows an alternative arrangement in which the light from source 130 is diffused through a diffusing sheet 131 close to and parallel to the edge of the platen, before being totally reflected off the internal upper surface of the platen 120 towards the camera 118. For this arrangement, the deformable layer 110' is dark. Areas of the top of the platen in contact with air, viewed from the angle shown, behave as a mirror from which light is reflected. However, wherever the deformable strands make contact with the platen the internal reflections become frustrated and the black deformable material gives a dark appearance.

Instead of having light source 130 on the left hand side of the platen shining through the diff-using sheet 131, a light source as indicated at 130a may be used on the right hand side of the platen, shining through the platen onto a diffuse reflecting sheet similar to sheet 131 which then reflects light back onto the upper surface of the platen and into the camera 118. Having the light source at position 130a, i.e. on the same side of the platen as the camera, is convenient for saving space.

Figure 7A:
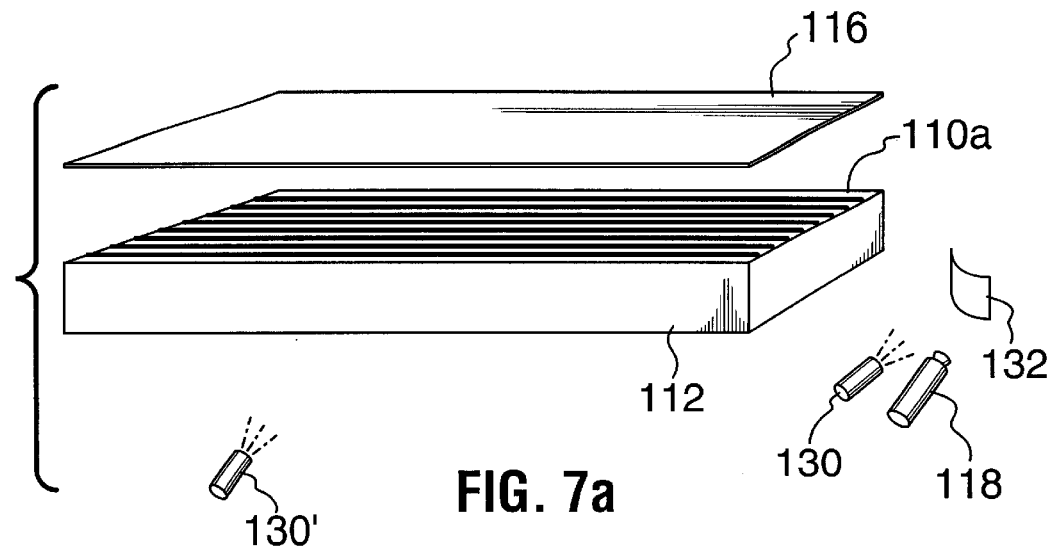
FIGS. 7a and 7b are perspective views of arrangements similar to those of FIGS. 5a and 5b, but using mirrors and lenses to improve the image received.
Figure 7B:
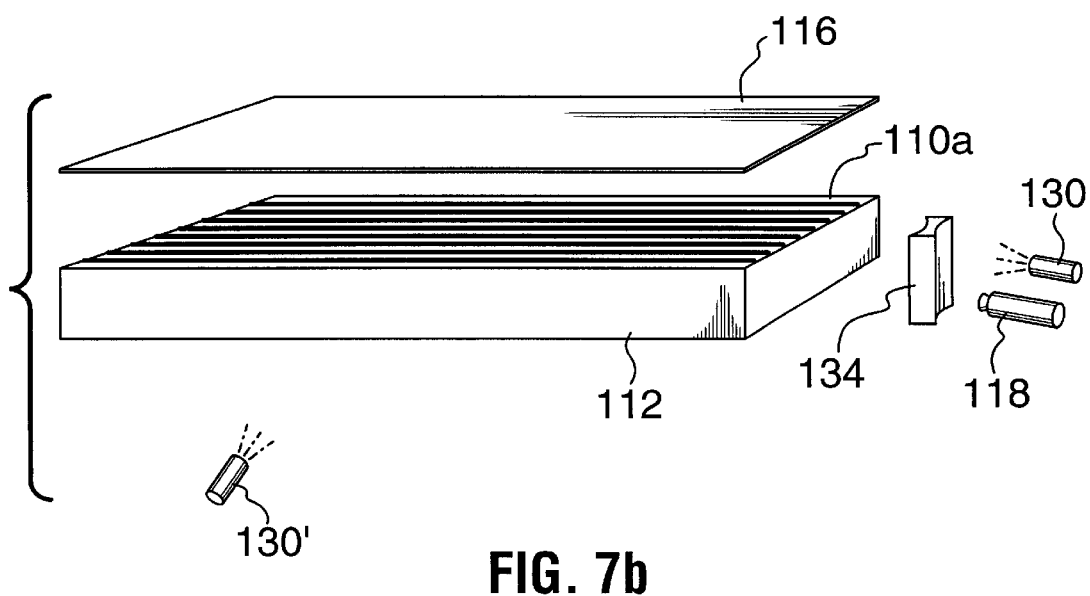

FIG. 7a shows a variation of the FIG. 5b arrangement where the strands 110a are laid parallel to the direction of the light, i.e. orientated at 90° relative to the orientation in FIGS. 5a and 5b. As in the FIG. 5b embodiment, the strands are preferably white or light in color (notwithstanding the black appearance in the drawings). Also, in this embodiment, the optical path between the camera 118 and the light source 130 includes a curved mirror 132, which has the effect of foreshortening the image received from the elongated edge of the platen so that it has a width/length ratio better suited to the video camera. FIG. 7b shows a similar arrangement, except that instead of the curved mirror 132, a cylindrical lens 134 is used. In both FIGS. 7a and 7b, references 130 and 130' show alternative positions for the light source.

Figure 8:
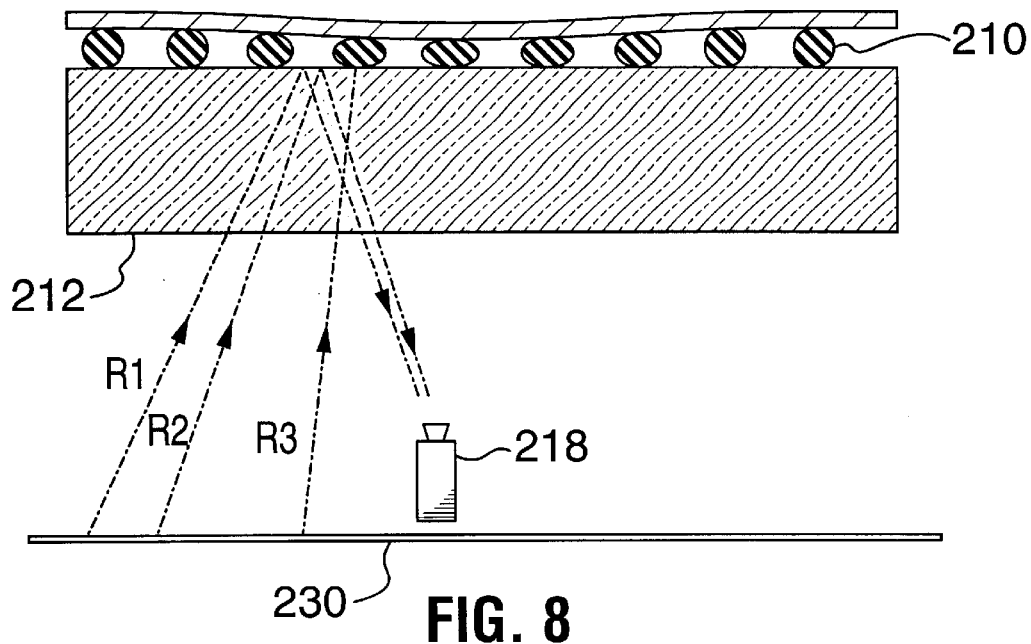
FIG. 8 shows a further variation of the arrangement shown in FIG. 5b.

FIG. 8 shows a variation of the FIG. 5b arrangement in which partial internal reflection from the inner surface of the platen is used. Here, a sheet-form, diffuse light source 230 is situated underneath the transparent platen 212 and directs light upwards towards the top of the platen; source 230 may be a translucent sheet illuminated from below or a white sheet illuminated from above. The deformable layer 210 is preferably black. Since the angle of incidence of the light is less than the critical angle required for total internal reflection, not all of the light is reflected from the upper internal surface of the platen, but nevertheless a substantial part is reflected into the camera 218 from areas of the platen which are in contact with air, and which appear white. Sample light rays which are reflected in this way are shown at R1 and R2. Where there is contact with the dark deformable layer 210, light rays such as ray R3 are absorbed, and such areas appear dark.

Figure 9:
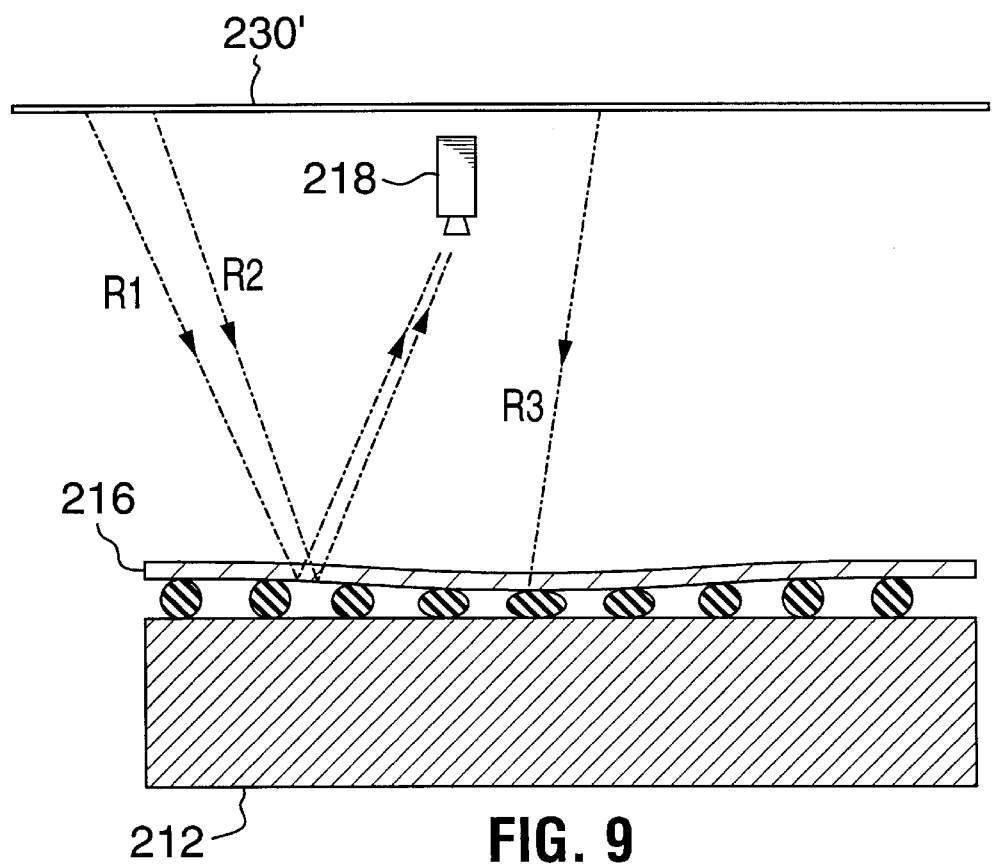
FIG. 9 shows yet another variation of the arrangement shown in FIG. 5b.

FIG. 9 shows an embodiment similar to FIG. 8 but in which the platen 212 is non-transparent, and a transparent load-receiving sheet 216 is used. As in FIG. 8, the light/camera arrangement uses partial internal reflection, but this time reflection is off the lower, internal surface of the sheet 216. As in FIG. 8, the light is provided by a diffuse light emitting sheet 230', in this case above the load receiving sheet, and is reflected back into the camera 218, as shown for sample light rays R1 and R2, wherever a gap is maintained under the sheet 216. The camera records dark areas where pressure causes the sheet 216 to contact the black strands of the deformable layer 210 and where reflection, as for example of light ray R3, is frustrated. The light source 320' may be similar to the light source 230 of FIG. 8, i.e. a white translucent sheet illuminated from behind or a diffusing sheet reflecting light from its lower surface, or the light source may be diffuse ambient light including daylight or indirect room lighting.

Figure 10:
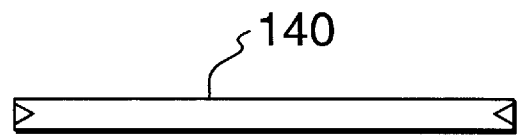
FIGS. 10 and 11 are views of a preferred camera arrangement for the variation of FIG. 5c.
Figure 11:
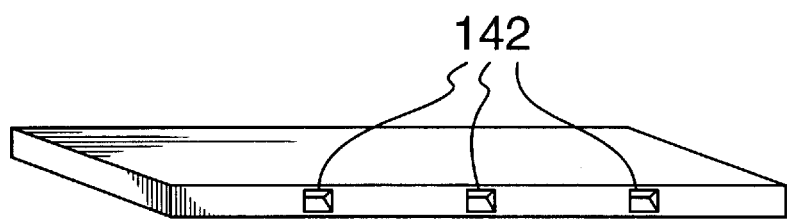
Figure 12:
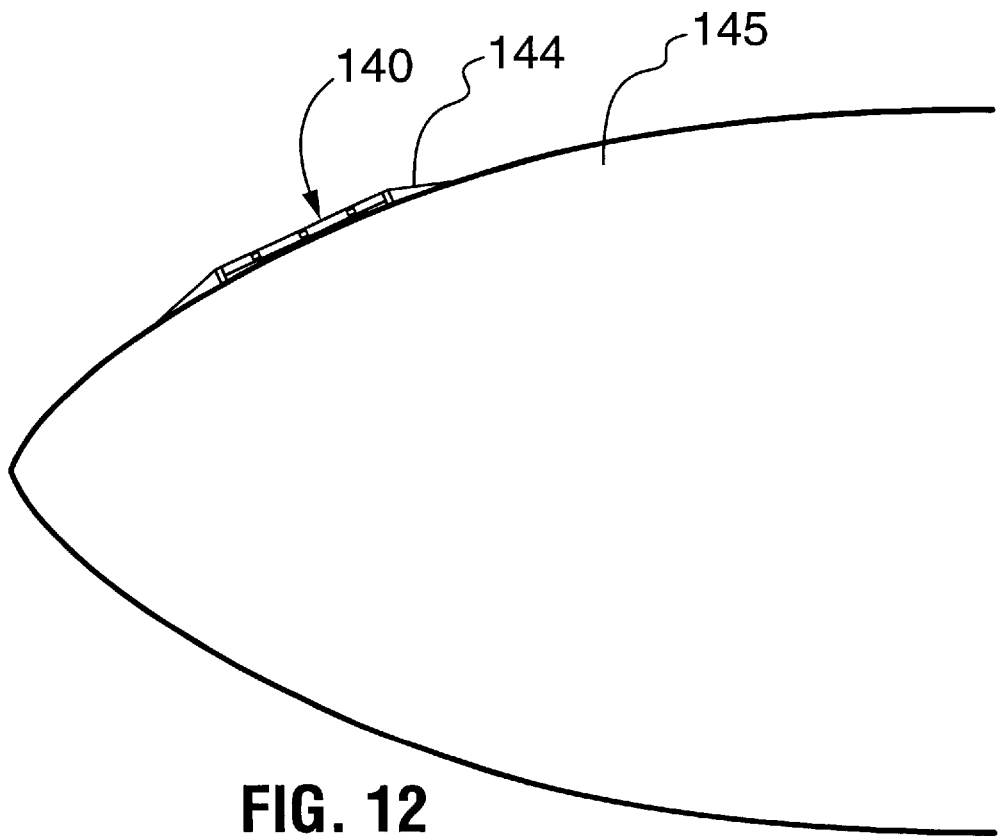
FIG. 12 shows a plan view of a ship bow having a sensor mounted thereon in accordance with the invention.

FIGS. 10, 11, and 12 show a practical application of the invention to measurement of ice pressure on the bow of a ship. The embodiment is similar in principle to that of FIG. 5c, and includes a platen/deformable layer/load receiving sheet sensor unit indicated at 140, the opposite edges of which each have several recesses or ports 142 for receiving cameras which view the inner surface of the transparent platen on the side opposite to the load receiving side, as in FIG. 5c, and which view the reflection of the outer surface of the platen caused by its total internal reflection in the bottom surface. Hence the amount of contact, and its variation with load, can be determined visually using the video cameras. FIG. 12 shows how a unit 140 can be mounted on the bow 145 of a ship to measure the ice impact pressure. The ends of the unit are held and protected by gussets 144, and the camera ports are fitted with small waterproof video cameras connected to electrical circuits within the hull by waterproof connections.

The advantages of the systems described are as follows:
1. Pressure data can be provided at high spatial resolution over a large area, of several square meters; the invention can also be used with small areas of less than one square centimeter;
2. The camera may be remote from the platen and sensing parts, but the direct viewing means that electrical connections, and electrical cross-talk, are eliminated; optical fibers are also not required;
3. It requires very simple materials and is easily fabricated;
4. It can be used for low or high pressure/load applications by the choice of suitable elastic properties and physical dimensions for the deformable layer;
5. The data are acquired visually and in digital format and are therefore available immediately for visual and/or quantitative analysis.
6. Depending on conditions, the deformable layer can be monitored from below the platen, above the platen, or from the platen edges where the faces of the platen are not accessible.

What is claimed is:

1. Apparatus for sensing loading applied to a surface, comprising:

a platen providing a continuous, unapertured surface which is stiff relative to loads being detected;

a load receiving sheet extending over the platen surface and having an outer load receiving surface;

a layer of deformable material separating and capable of contacting both the platen surface and the load receiving sheet and which is compressed in thickness when said loads are applied to the sheet;

one of said platen or load receiving sheet being a transparent member, said layer of deformable material being provided within regularly spaced voids such that the deformable material bulges into said voids when compressed across its thickness, and such that the deformable material has an area of contact with the transparent member which increases as the deformable material is compressed in thickness;

and said apparatus including means viewing a region of said deformable material layer through a surface of said transparent member, which region has a plurality of said voids, said viewing means detecting local increases in said area of contact between the deformable material and the transparent member caused by loading of the load receiving sheet.

2. Apparatus according to claim 1, wherein said viewing means includes a video camera.

3. Apparatus according to claim 1, wherein said load receiving sheet is flexible and bends in response to said loads to compress areas of said deformable material layer corresponding to areas of the layer subjected to loads.

4. Apparatus according to claim 1, wherein said platen is a sheet of transparent material and constitutes said transparent member.

5. Apparatus according to claim 2, wherein said load receiving sheet is the transparent member, and said video camera views said deformable material layer through said load receiving sheet, and detects increases in said area of contact caused by loading of the load receiving sheet.

6. Apparatus according to claim 4, wherein said voids in the deformable material are such that the area of contact between said material and the platen increases as the voids are reduced in area, and wherein said viewing means detects the area of the deformable material in contact with the platen.

7. Apparatus according to claim 6, wherein the platen is a slab of transparent material having opposed flat edge surfaces, the apparatus including a light source directing light into one of said edge surfaces at an angle providing total internal reflection at surfaces of the platen adjacent said voids in said deformable layer, and a video camera viewing the area of contact between the platen and the deformable layer and detecting locations where total internal reflectance is frustrated.

8. Apparatus for sensing loading applied to a surface, comprising:

a transparent platen providing a continuous, unapertured surface which is stiff relative to the loads being detected;

a flexible load receiving sheet extending over the platen surface and having an outer load receiving surface;

a layer of deformable material separating and capable of contacting both the platen surface and the load receiving sheet and which is compressed in thickness when said loads are applied to the sheet;

said deformable layer being provided with regularly spiced voids such that the deformable material bulges into said voids when compressed across its thickness, and such that the contact area between the deformable material and the sheet increases as the material bulges into the voids;

said apparatus including means viewing a surface of said transparent platen where it contacts the deformable member and detecting increases in said contact area caused by pressures on the load receiving sheet.

9. Apparatus according to claim 8, wherein the platen is a slab of transparent material having opposed flat edge surfaces, the apparatus including a light source directing light into one of said edge surfaces at an angle providing total internal reflection at surfaces of the platen adjacent said gaps or apertures in said deformable layer, and a video camera viewing the deformable member at said contact area where contact between the deformable member and the platen frustrates total internal reflection.

* * * * *

UNITED STATES PATENT AND TRADEMARK OFFICE
CERTIFICATE OF CORRECTION

PATENT NO.   : 6,267,014 B1
DATED        : July 31, 2001
INVENTOR(S)  : Robert E. Gagnon It is certified that error appears in the above-identified patent and that said Letters Patent is hereby corrected as shown below:

<u>Title page, Item [54] and Column 1, lines 1-2,</u>
Correct the title to read -- APPARATUS FOR SENSING A LOAD OR PRESSURE APPLIED TO A SURFACE -- instead of "APPARATUS FOR SENSING A LOAD OF PRESSURE APPLIED TO A SURFACE".

Signed and Sealed this

Third Day of June, 2003

JAMES E. ROGAN
*Director of the United States Patent and Trademark Office*